(12) United States Patent
Rajkumar et al.

(10) Patent No.: US 12,167,210 B2
(45) Date of Patent: Dec. 10, 2024

(54) ENABLING ENVIRONMENTAL SOUND RECOGNITION IN INTELLIGENT VEHICLES

(71) Applicant: Carnegie Mellon University, Pittsburgh, PA (US)

(72) Inventors: Raganathan Rajkumar, Monroeville, PA (US); Swapnil Das, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 88 days.

(21) Appl. No.: 17/678,386

(22) Filed: Feb. 23, 2022

(65) Prior Publication Data

US 2022/0272448 A1 Aug. 25, 2022

Related U.S. Application Data

(60) Provisional application No. 63/163,339, filed on Mar. 19, 2021, provisional application No. 63/153,595, filed on Feb. 25, 2021.

(51) Int. Cl.

| | |
|---|---|
| *H04R 3/00* | (2006.01) |
| *B60W 50/00* | (2006.01) |
| *B60W 60/00* | (2020.01) |
| *G10L 21/028* | (2013.01) |
| *G10L 25/51* | (2013.01) |
| *H04R 1/08* | (2006.01) |
| *H04R 1/40* | (2006.01) |

(52) U.S. Cl.
CPC ............ *H04R 3/005* (2013.01); *B60W 50/00* (2013.01); *B60W 60/001* (2020.02); *G10L 21/028* (2013.01); *G10L 25/51* (2013.01); *H04R 1/08* (2013.01); *H04R 1/406* (2013.01); *B60W 2050/0052* (2013.01); *B60W 2420/54* (2013.01); *H04R 2410/07* (2013.01); *H04R 2499/13* (2013.01)

(58) Field of Classification Search
CPC .......... H04R 3/005; H04R 1/08; H04R 1/406; H04R 2410/07; H04R 2499/13; G10L 21/028; G10L 25/51; B60W 60/001; B60W 50/00; B60W 2050/0052; B60W 2420/54
USPC ................................. 381/56, 58, 86, 91, 302
See application file for complete search history.

(56) References Cited

U.S. PATENT DOCUMENTS

| | | | |
|---|---|---|---|
| 2010/0214086 A1* | 8/2010 | Yoshizawa | G08G 1/166 381/56 |
| 2019/0045319 A1* | 2/2019 | Hotary | H04S 7/303 |
| 2019/0164539 A1* | 5/2019 | Schmidt | G06F 40/284 |

(Continued)

OTHER PUBLICATIONS

Jang, A Development of the Vehicle Sound Source Localization System, p. 1241-1244.*

(Continued)

*Primary Examiner* — William A Jerez Lora
(74) *Attorney, Agent, or Firm* — KDW Firm PLLC (57) ABSTRACT

A system and method implementing an acoustic mapping suite that equips intelligent vehicles with the ability to identify and respond to primary sounds of interest in their environment. The invention performs sound separation, localization and classification techniques, while also generating a sound-based map of the vicinity as well as making inferences and qualitative assessments about sound sources with information over time.

28 Claims, 8 Drawing Sheets

(56) References Cited

U.S. PATENT DOCUMENTS

2022/0059118 A1* 2/2022 Chng ............... G10K 11/17873
2023/0147768 A1* 5/2023 Vaswani .............. G05D 1/0246
                                                                                                701/23

OTHER PUBLICATIONS

Grondin et al., "Lightweight and Optimized Sound Source Localization and Tracking Methods for Open and Closed Microphone Array Configurations", Robotics and Autonomous Systems 113:63-80 (2018).

Mizumachi et al., "Robust Sensing of Approaching Vehicles Relying on Acoustic Cues", Sensors 14:9546-9561 (2014).

Salamon et al., "A Dataset and Taxonomy for Urban Sound Research", MM '14: Proceedings of the 22nd ACM International conference on MultimediaNov. 2014 pp. 1041-1044. https://doi.org/10.1145/2647868.2655045.

Schulze-Forster et al., "Weakly Informed Audio Source Separation," 2019 IEEE Workshop on Applications of Signal Processing to Audio and Acoustics (WASPAA), 2019, pp. 273-277, doi: 10.1109/WASPAA.2019.8937266.

Skagerstrand et al., "Loudness and annoyance of disturbing sounds—perception by normal hearing subjects", J Intl Audiol 56(10):775-783 (20107). doi: 10.1080/14992027.2017.1321790.

* cited by examiner

ENABLING ENVIRONMENTAL SOUND RECOGNITION IN INTELLIGENT VEHICLES

CROSS-REFERENCE TO RELATED APPLICATIONS

This application claims the benefit of and priority to previously filed U.S. Provisional Patent Application Ser. No. 63/153,595 filed Feb. 25, 2021, entitled "SYSTEMS AND METHODS TO RECOGNIZE AND RESPOND TO ENVIRONMENTAL SOUNDS IN INTELLIGENT VEHICLES". This application also claims the benefit of and priority to previously filed U.S. Provisional Patent Application Ser. No. 63/163,339 filed Mar. 19, 2021, entitled "ENABLING ENVIRONMENTAL SOUND RECOGNITION IN INTELLIGENT VEHICLES". Both provisional applications are incorporated herein in their entireties.

BACKGROUND

Intelligent vehicles are vehicles that utilize sensors and real-time processing capabilities to recognize obstacles and constraints in their environment. Obstacles can include objects, vehicles, pedestrians and the like. Constraints can include, for example, the presence or absence of pathways, speed limits and lane markers.

In response to the changing environment, intelligent vehicles may generate alerts for the vehicle operator, allowing the operator to react by taking appropriate preventive or evasive action to keep the vehicle safe. Autonomous vehicles are a special class of intelligent vehicles that can operate independently with little or no need for a human operator. Autonomous vehicles may also be referred to as driverless vehicles or self-driving vehicles.

Intelligent vehicles and autonomous vehicles typically use multiple sensor types such as cameras, radars, lidars, ultrasonic sensors and the like to sense their environment and to inform a control system of the vehicle such as to allow the control system to make intelligent decisions regarding the operation and safety of the vehicle in the environment, as well as providing for the safety of pedestrians and operators of other vehicles. Many of these sensors require a line of sight between the sensors and the obstacles.

Human operators of vehicles have an added advantage provided by the capability to sense audible sounds that may originate out of the line of sight of the human operator, for example, horns, emergency vehicle sirens and train whistles. Humans are able to assess the direction, proximity and nature of these sounds and respond adaptively to these sounds. This aural capability is complementary to the human senses of sight and tactility and enables human operators to react sooner to a broader range of obstacles.

Providing an aural capability to autonomous vehicles would provide valuable insights to inform vehicle behavior at a more nuanced level. For example, recognizing the presence of horns, sirens or train whistles could enable an autonomous vehicle to stop or yield as needed. Thus, it would be desirable for autonomous vehicles to be able to have the added benefit of recognition of environmental sounds to assist in making context-based decisions. Hence, there is a need for systems and methods to add aural capabilities to autonomous vehicles.

SUMMARY

Disclosed herein are systems and methods for providing an aural capability for autonomous vehicles including, but not limited to, land vehicles, aircraft and watercraft (both surface and submarine watercraft), to recognize certain environmental sounds and to use the recognized sounds to guide actions of the intelligent vehicles as they move through the environment. Although the invention is explained in terms of intelligent and autonomous land vehicles traveling on surface roads, the systems and methods apply equally well to other forms of vehicles.

The invention comprises a system and method embodying an acoustic mapping suite that equips autonomous vehicles with the ability develop a sound-based map of their vicinity, to make inferences and qualitative assessments about sound sources over time and to use that information to assist in the control of an autonomous vehicle. The system and method performs sound separation of various environmental sounds, localizes the sources of the sounds and classifies the sounds as being either primary sounds of interest (and, more specifically, which sound of interest) or other, less interesting environmental sounds.

Thereafter, the sounds may be assigned with an importance score, which is a metric that reflects the importance a human operator would likely place on the sound. The sound map may thereafter be used as an input to the control system of an autonomous vehicle.

BRIEF DESCRIPTION OF THE DRAWINGS

The invention is described in detail below with reference to the following figures, wherein like reference characters no corresponding parts throughout the several views.

DEFINITIONS

As used herein the term "exterior sounds" refers to sounds having sources external to the vehicle.

As used herein, the term "interior sounds" refers to sounds having sources internal to the vehicle.

As used herein, the term "focus sounds" refers to primary environmental sounds of interest which may be used by an intelligent vehicle for generating alerts or acted upon by a control system for an autonomous vehicle.

As used herein, the term "intelligent vehicle" refers to a vehicle capable of detecting and analyzing environmental conditions and providing alerts to an operator of the vehicle.

As used herein, the term "autonomous vehicle" refers to a vehicle capable of detecting and analyzing environmental conditions and acting independently of a human operator to control the operation and safety of the vehicle.

As used herein, the term "vehicle", unless otherwise indicated, refers to an intelligent vehicle or an autonomous vehicle including, but not limited to, land vehicles (both road and rail land vehicles), aircraft and watercraft (both surface and submarine watercraft).

DETAILED DESCRIPTION

The systems and methods of the present invention, implementing an aural capability for intelligent vehicles, has the potential to enhance the safety of both intelligent vehicles and, in particular, autonomous vehicles.

The aural capability can be combined with the outputs of other sensors to enhance the reliability and trustworthiness of alerts generated by an intelligent vehicle, and the responses triggered by an autonomous vehicle.

As an example, if camera, radar and/or lidar sensors report another vehicle in the vicinity of the intelligent vehicle, and the systems and methods of the present invention detect a sounding horn with high confidence in the direction and approximate location of the other vehicle, a confidence level in the detection of the horn sound can be high. Conversely, if no other sensor detects another vehicle, the output of the systems and methods of the present invention may be assigned a lower confidence level. As another example, if map information does not indicate a railroad in the proximity of the intelligent vehicle but the system and method of the present invention reports a train whistle nearby, it may indicate either low confidence level in the report of the train whistle or, alternatively, a map error that needs to be fixed. The confidence level associated with the localizations of a sound can be raised or lowered based on confirmation of the localization by other sensors on the vehicle. For example, a camera may provide a visual confirmation of the localization of a horn sound by visualizing a car at a location corresponding to the localization of the horn sound. The confidence level may be used by the vehicle to cause the vehicle to react immediately to a sound or to ignore the sound. Sounds having a high confidence level may be acted upon immediately while sounds having a low confidence level, for example, a confidence level below a certain threshold, may be ignored by the vehicle. Similarly, when the confidence level associated with the sound is very high, it can be used to validate or invalidate the localization outputs produced by other sensors. Furthermore, the sound localization process can be used to confirm the validity of maps or detect errors in the map database.

The addition of an aural capability to an intelligent vehicle requires one or more sensors, in the form of microphones, processing to determine the nature of the sounds picked up by the microphones, and actuation. On an intelligent vehicle, the actuation may be restricted to only the generation of alerts to one or more human operators. On an autonomous vehicle, the actuation may slow down, stop or steer the vehicle depending on the context and the nature of the sound.

At least one microphone is needed per intelligent vehicle to hear sounds from the environment exterior to the intelligent vehicle. In preferred embodiments, the system may use multiple microphones distributed across the intelligent vehicle. The use of multiple microphones enables the use of differences in sound arrival times to calculate the orientation of the source of the sound relative to the intelligent vehicle. The time differences can also help determine the approximate distance of the source of the sound from the intelligent vehicle. The sound source can then be localized using the orientation and the distance.

Sounds from different sources occupy specific frequency bands. One means of separating and classifying sound sources can be to use their respective frequency bands as a criterion. An intelligent vehicle can be moving at a relatively high speed of several meters per second (tens of kilometers per hour) or higher. Similarly, objects in the environment can also be moving at similar speeds. At these speeds, the Doppler Effect comes into play. In the Doppler Effect, there is an increase (or decrease) in the frequency of sound, light, or other waves as the source and observer move relative to each other. The effect may cause, for example, a change in pitch of a passing siren. Loud external sounds can reverberate from obstacles such as buildings in the environment and echoes can be produced in open spaces with obstacles at a distance from the vehicle. These environmental effects can be detected and accounted for by the process of separating and classifying exterior sounds.

Figure 1:
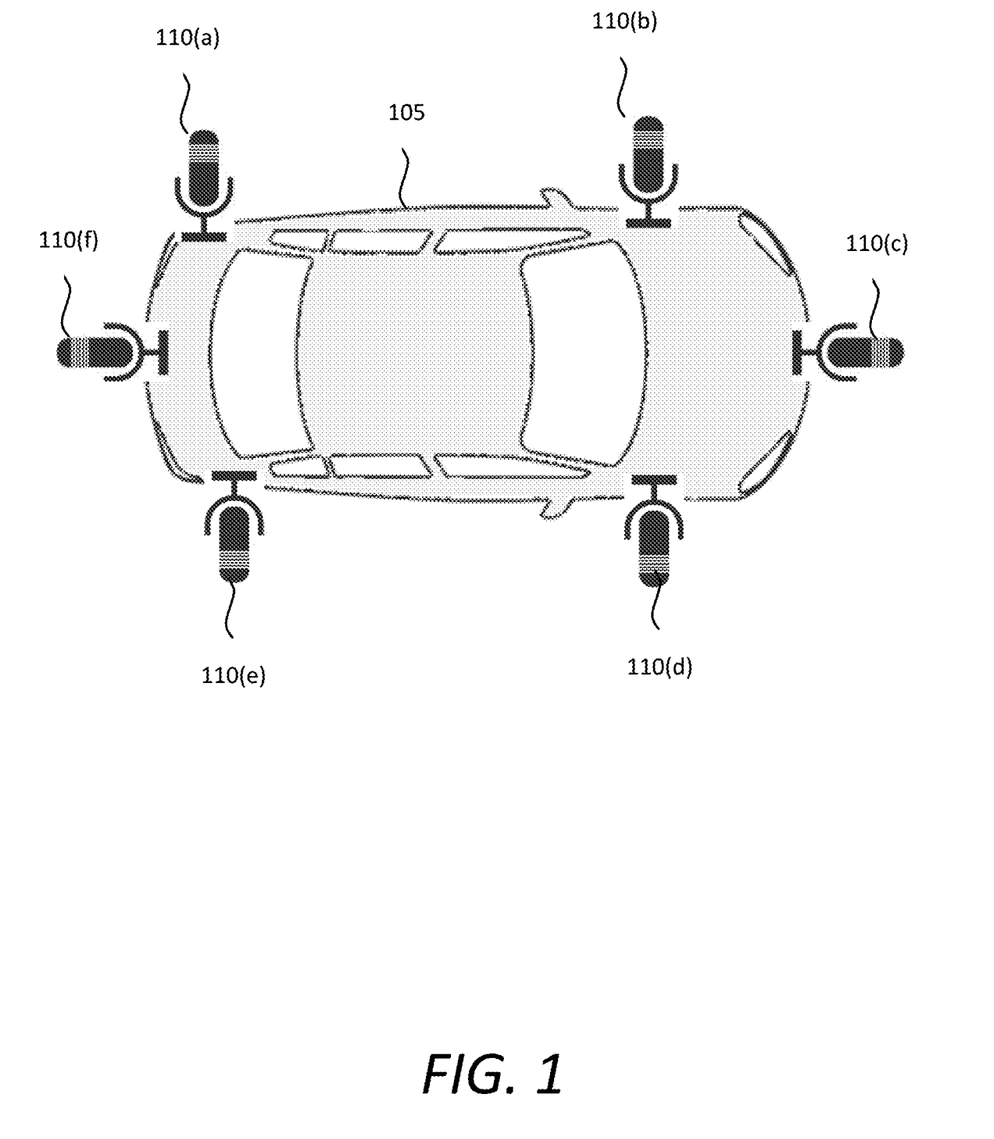
FIG. 1 is a top view of an intelligent vehicle in accordance with the first embodiment of the invention wherein microphones are placed on the exterior of the intelligent vehicle.

The microphones used by the system and method of the present invention can be mounted on the either the exterior or the interior of the vehicle (or both). FIG. 1 shows a first embodiment of the invention in which one or more of microphones 110(a-f) are placed on the exterior of vehicle 105. Note that, although six microphones are shown, the invention may be used with as few as one microphone. Microphones that are mounted on the exterior of the vehicle have the advantage of being able to pick up exterior sounds without the exterior sounds being dampened by the body of the vehicle. However, if the vehicle is in motion, wind noise, air noise and fluid noise can corrupt the sound signals and would therefore require filtering. Wind noise reduction techniques, such as the use of furry foam microphone covers, may be used, however, they are unsightly and poor weather conditions (precipitation) can introduce additional maintenance requirements.

Figure 2:
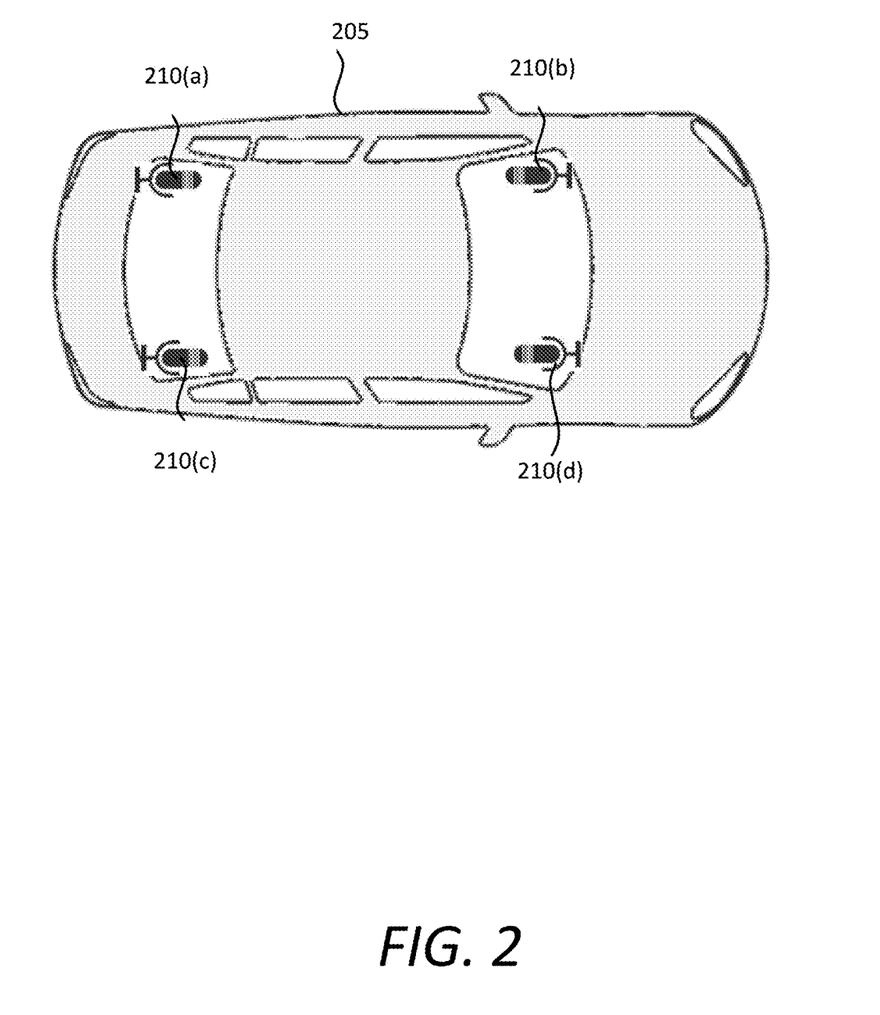
FIG. 2 is a top view of an intelligent vehicle in accordance with a second embodiment of the invention wherein microphones are placed on the interior of the intelligent vehicle.

FIG. 2 shows a second embodiment of the invention in which the microphones 210(a-d) are mounted in the interior of the vehicle. Microphones that are mounted in the interior of the vehicle are much less affected by exterior wind and/or fluid noise. However, exterior sounds, including the focus sounds, can be significantly dampened by the body of the vehicle. As such, with an interior mounting of microphones, only loud exterior sounds can be detected and classified. For example, in the automotive context, emergency vehicle sirens, train whistles and vehicle horns can still be heard inside the vehicle cabin. Interior sounds, such as radio, music and human conversations, are also easily heard and may need to be filtered to allow the detection and classification of exterior sounds. In one embodiment of the invention, interior sounds can also be separated, classified and localized to allow the intelligent vehicle to alert the operator that significant distractions are present. An embodiment in an autonomous vehicle can slow down and stop the vehicle when significant distractions are detected.

The systems and methods of the present invention perform a process to provide the aural capability to intelligent vehicles that may be summarized as follows: (1) sounds from the environment of the vehicle (exterior and/or interior) are separated in terms of distinct sources; (2) after separation, the sound sources are localized in the context of information regarding the environment of the vehicle, for example, but not limited to, a map, the position of the vehicle, the direction of the arrival of sound over time, etc.; (3) the detected sound sources are classified using a classifier which may be, for example, a convolutional neural network trained in the detection of one or more focus sounds. In certain embodiments of the invention, for example, when the invention is used in land vehicles, the classifier may be trained for detecting land-based focus sounds, including, but not limited to, car horns, vehicle sirens and train whistles. Additional focus sounds may be added by simply providing additional training data to the classifier. The classifier may be trained differently for different types of vehicles; and (4) an importance score is optionally assigned to the detected focus sounds describing the importance a human would likely assign to the sound. The importance score is a metric that may be used to inform the decision-making process of the vehicle of the urgency of responding to the sound. Note that, in some embodiments, the step of the process wherein the importance value is assigned may be optional, in which case it may be up to the control system of the vehicle to determine the importance of the sound and take the appropriate action.

Figure 3A:
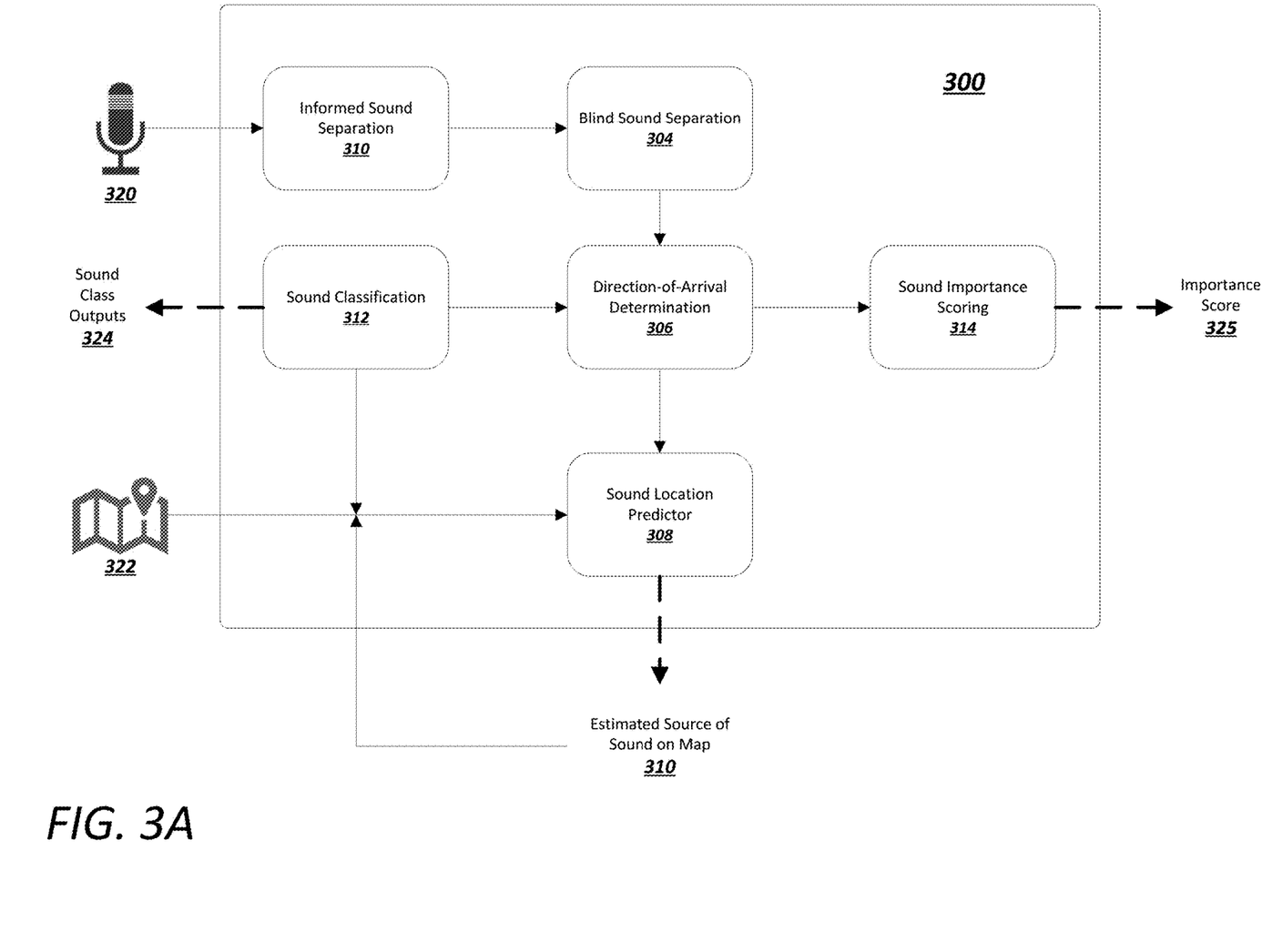
FIG. 3A is a block diagram showing the components of the sound recognition system of the present invention.

FIG. 3A is a block diagram showing the components of the sound recognition system 300 of the present invention for adding aural capabilities to an intelligent vehicle. Sounds in the operating environment of the vehicle are sensed by one or more microphones 320. The informed sound separation component 310 utilizes known information such as frequency bands of the focus sounds and separates the sounds from different sources. The blind sound separation component 304 generates hypotheses about the locations of the sources of the sounds. The direction of sound arrival determination component 306 computes the direction from which the sounds are arriving at the vehicle. The sound classification component 312 classifies the separated sounds into their respective classes, which can then be output from the sound recognition system 300 as sound class outputs 324.

The sound location predictor component 308 takes as input a map 322 of the surrounding region and places constraints on locations of the sources of the sounds. For example, the siren of an emergency vehicle in motion can be constrained to have its source location be along a roadway near the intelligent vehicle. Similarly, a train whistle must originate from a train located on a track. The roadway information can be obtained from map 324 or the sensors on the intelligent vehicle. The sound location predictor component 308 outputs an estimated source of the sound on a map 310 as an output of the sound recognition system 300.

The sound importance scoring component 314 calculates an importance score as described below and outputs the important score 325 as an output of the sound recognition system 300 of the present invention.

Sound Separation

Sound separation is important because the vicinity of the intelligent vehicle is often filled with many different sounds. In one embodiment of the invention, sound separation is driven by Open embeddeD Audition System (ODAS), which is an open-source software library for performing sound separation. In addition, ODAS provides direction of arrival information for the sounds. In other embodiments, other methods may be used for sound separation.

There are some sounds that can be controlled and accounted for, namely, the sounds inside the vehicle that the microphones will invariably pick up (e.g. human voices, radio sounds, crying babies, barking dogs, etc.). Knowing what to expect allows a degree of informed separation to improve the quality of the sound separation and to isolate unknown externalities. Two main use-cases drive the goal of separating sounds inside the car. First, human voices from the driver or passengers. In this case, only broad-stroke knowledge of the range of human frequency voices is available, because no guarantees can be made about the people inside of the vehicle. Second, sounds from the radio. With respect to sounds from the radio, the potential exists to get operational information from the vehicle itself, allowing the possibility of eliminating radio sounds as a source of confusion for separation.

By encoding typical human voices or specific musical information, the weakly-informed separation module uses a linear model of sound and minimizes the impact of such disturbances. Because the focus sounds are considerably louder and designed to be heard over standard noise in a vehicle, the focus sounds get picked up as expected. This preprocessing step is applied to improve the performance of the separation module and to remove extenuating factors from within the vehicle that can negatively impact its blind separation of external audio.

The ambient noise of car vibrations or hums can also be picked up easily by a microphone placed inside the vehicle cabin. These sounds, however, occupy the lower end of the frequency spectrum and do not tend to conflict with the focus sounds that the system attempts to separate and locate. A high-pass filter may be utilized to remove such background noise before performing separation.

Figure 3B:
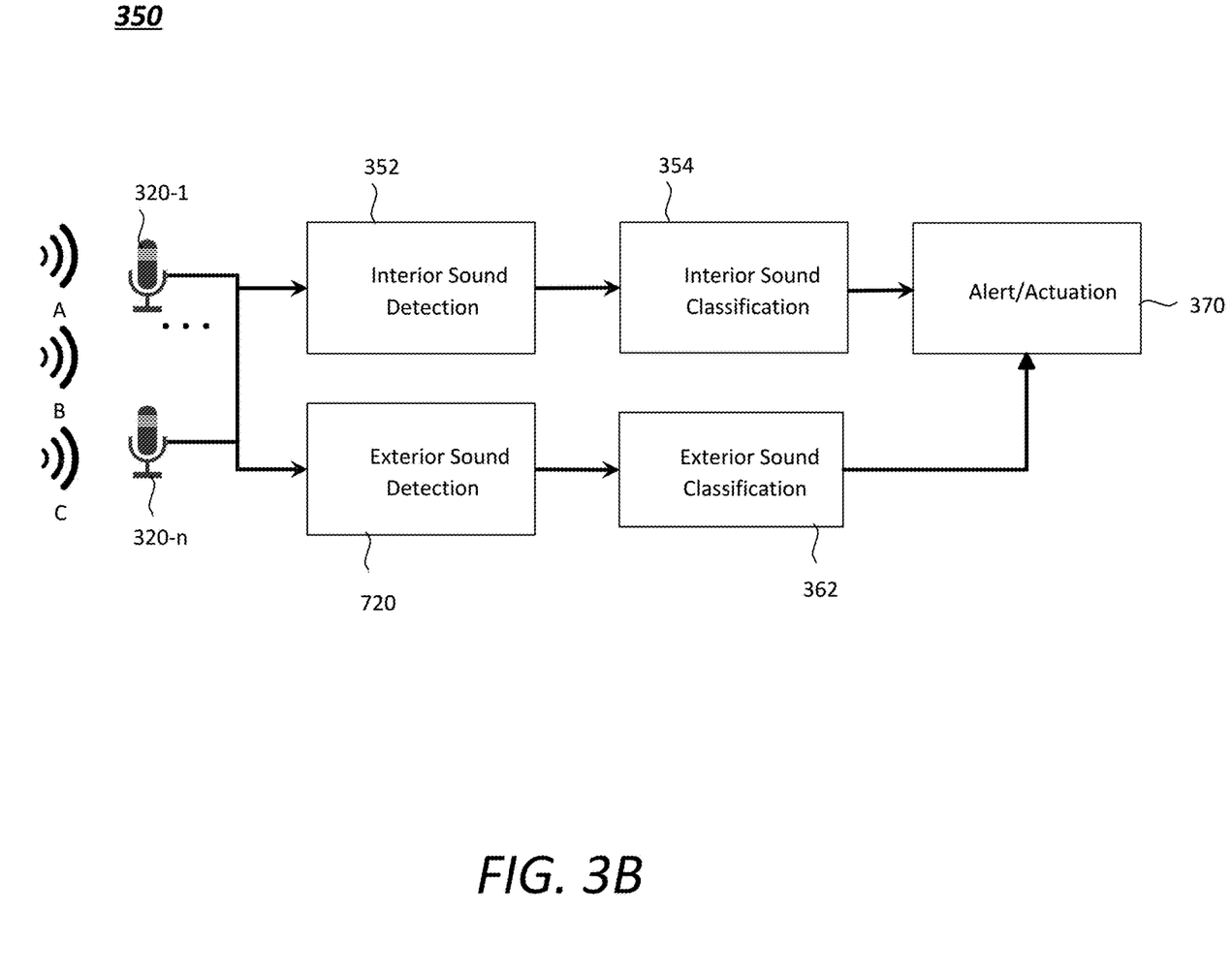
FIG. 3B is a block diagram showing components of a subsystem of the present invention for separating interior sounds from exterior sounds and classifying both the interior and exterior sounds.

FIG. 3B depicts a software subsystem 350 that can separate sounds between exterior and interior sounds in an intelligent vehicle, and can react to the detections by generating alerts, changing the vehicle's behavior, or both. Sounds A, B, C can be picked up by microphones 320-1 . . . 320-n on the exterior or interior of the intelligent vehicle. The interior sound detection component 352 separates interior sounds from sounds A, B, C. The interior sound classification component 354 classifies the interior sounds into classes of interest such as radio news, music playing, human conversations, human voices, human screams and the like. The exterior sound detection component 360 separates exterior sounds from sounds A, B, C. The exterior sound classification component 362 classifies the exterior sounds into classes of interest such as emergency vehicle sirens, train whistles, vehicle horns and the like (for land-based vehicles). The classes of interest within interior and exterior sounds can be specified together or independent of each other. The alert/actuation component 370 can take as its inputs the interior and/or exterior sound classes detected and generate alerts, send out actuation commands to alter the vehicle's behavior, for example, to other subsystems of the vehicle control system, or do both. An alert can be visual, audible or tactile. Actuation on an intelligent vehicle can include, but is not limited to, reducing or muting the radio volume; increasing the alert volume; flashing a visual alert on the console, a heads-up display or both; and/or vibrating the operator's seat or steering wheel. Actuation on an autonomous vehicle can include, but is not limited to, slowing down, stopping, aborting a lane change, initiating a lane change, speeding up, beginning to move, aborting a turn maneuver at an intersection, initiating a detour path at an intersection, moving to the side of the road, making way for an emergency vehicle, undertaking an evasive maneuver, etc.

Sound Localization

The system and method of the present invention includes the ability to localize sounds in the vicinity of the intelligent vehicle. In some embodiments, the direction of arrival of the sound may be obtained as a by-product of the sound separation process and provided by the ODAS library, which provides direction of arrival information of tracked sounds over time with respect to the intelligent vehicle. This is accomplished, in some embodiments, using SRP-PHAT-HSDA localization and a modified 3D Kalman filter. In other embodiments, other methods may be used to obtain the direction of arrival.

Using the direction of arrival information as well as map data, a particle filter is used to generate and evaluate multiple hypotheses about the source locations of sounds. With the incorporation of real-world constraints and physical impossibilities (e.g., the source of a car horn cannot be localized to a location where a building stands, etc.), unlikely hypotheses can be discarded and a constrained localization system reliably identifies the presence of focus sounds near the vehicle and tracks their movements.

The identification and tracking of focus sounds are accomplished through only the available information—namely, the current location of the intelligent vehicle and a vector that captures the direction of the detected sound. At every point in time, location of the sound source can be narrowed as being along this vector. To this effect, multiple hypothesis particles are defined along the vector, with each assigned a weight corresponding to how probable it is that they are the actual sound source. This determination is made by comparing the decibels of the sound recorded at the intelligent vehicle and using the inverse-square law of sound propagation to determine where the likeliest source of the sound lies along the vector.

Between two successive points in time, the two sets of hypotheses generated by different vectors can be used to provide information about the sound source, such that impossibilities (and less probable hypotheses, if needed) can be discarded. Because sounds are being tracked with multiple direction of arrival vectors over time, the implication is that these hypotheses all represent the same sound source in different states. In other words, the sound source is also moving at each time-step.

Inspecting the various combinations of hypotheses at each timestep provides insight as to which hypotheses are likelier than others. For instance, a sound source that traveled between two hypotheses across different timesteps at an unnaturally fast speed would make the combination of those two more unlikely. Hence, the tree of possible states for a tracked sound does not grow rapidly and is pruned with the logic of the realistic limits of vehicular travel.

Note that, with respect to land-based vehicles, it may not be necessary to localize the sound in three dimensions. In such cases, the z-axis (i.e., the height) component of the localization of the sound is not necessary. However, as would be realized by one of skill in the art, for aircraft and watercraft, it may be necessary to localize a sound in three dimensions as these vehicles are capable of movement in three-dimensional space.

Sound Classification

Focus sounds can be identified using a classifier trained specifically to recognize the focus sounds. In one embodiment, the classification model may comprise a 13-layer convolutional neural network (CNN) with the architecture shown in FIG. 4. In one embodiment, the CNN was trained on the UrbanSound8K dataset which is a well-curated and labeled set of various road sounds, including focus sounds such as sirens and car horns, along with other sounds like construction work and street music. The CNN may be trained to recognize other focus sounds by adding additional training data specific to those sounds. For example, the UrbanSound8K dataset does not include train whistle sounds but was augmented with those sounds. Other focus sounds may be added simply by adding exemplars of those sounds to the training dataset.

Figure 4:
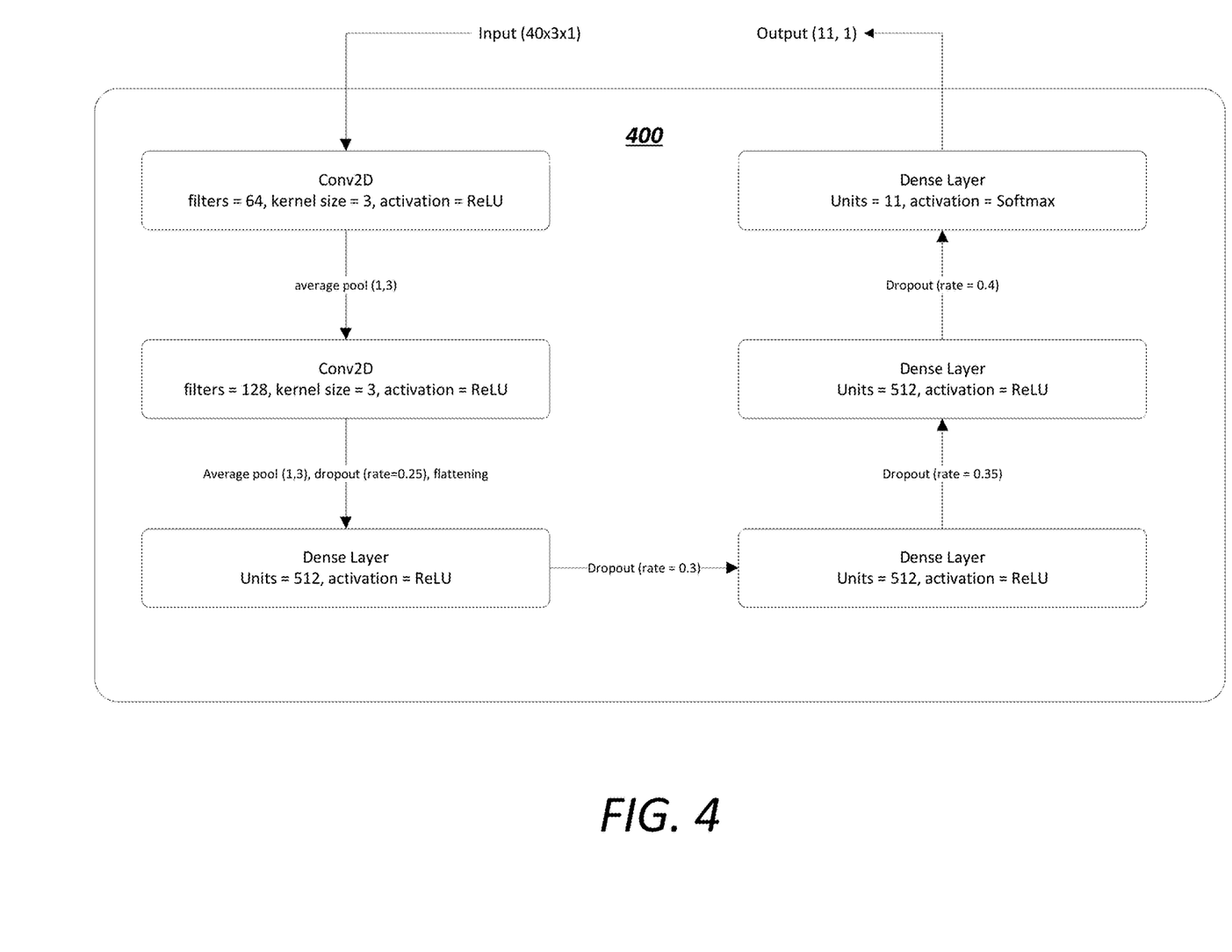
FIG. 4 is a block diagram of one possible embodiment of a classifier used for sound classification in the sound recognition system of the present invention.

The key features extracted by the CNN from the sound are MFCCs (Mel-frequency cepstral coefficients), Mel Spectrogram and Chroma STFT features. These features capture frequency-related information that is meaningfully distinct for the initial set of three focus sound classes (car horns, sirens and train whistles). The output obtained from the CNN generates predictions for all ten of UrbanSound8K's classes as well as an additional class to detect train whistle sounds. Only the precision and recall of the focus sounds may be of interest.

Sound Scoring

After classifying and localizing sounds in its vicinity, the intelligent vehicle needs to make decisions on how to respond. In such situations, it is instructive to see how much focus and attention specific external sounds would demand from a human driver. For example, a continuous siren or a barrage of horns would call for more of an immediate reaction from a driver as opposed to, for example, a distant train whistle.

The present invention therefore uses a numerical metric to capture the amount of attention required in response to a sound, considering factors like sound frequencies, proximity and duration.

Figure 5:
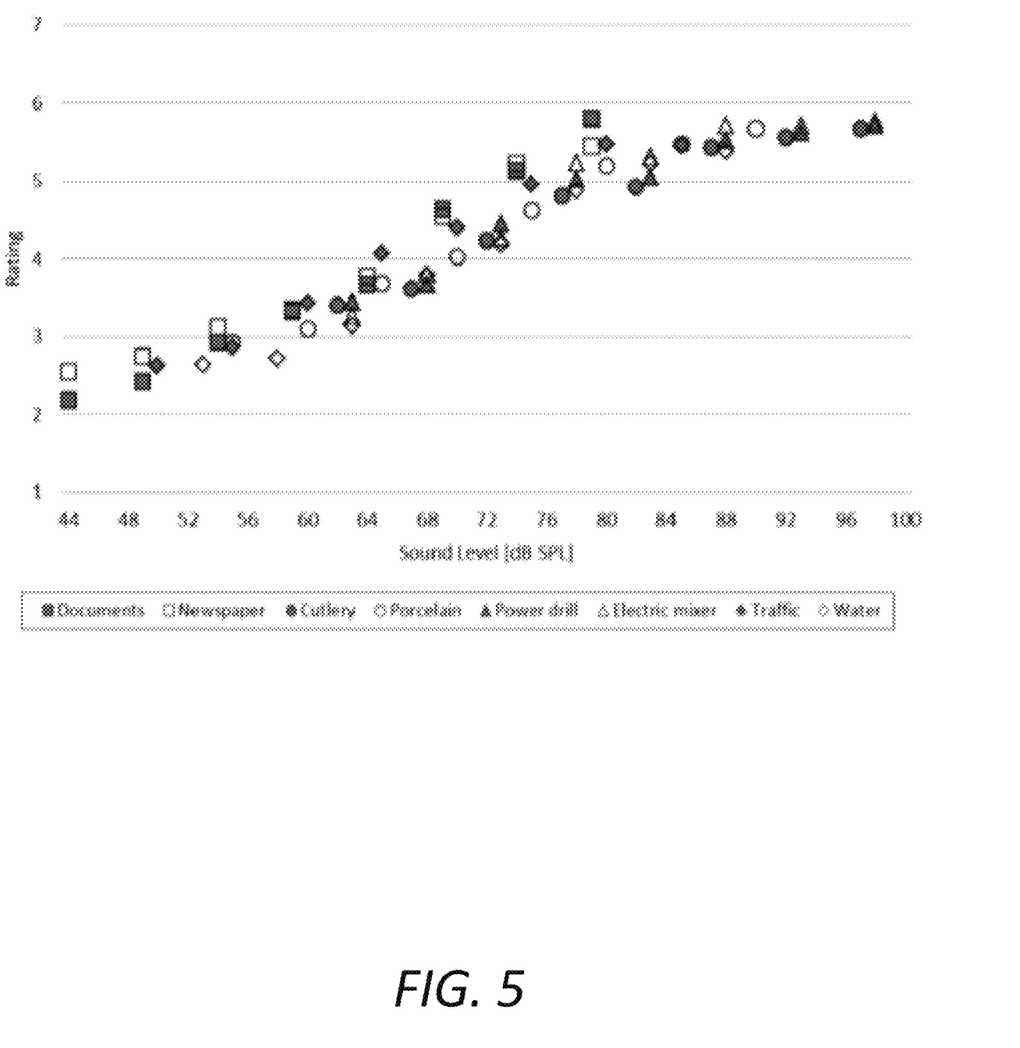
FIG. 5 is a graph showing the relationship between loudness and annoyance for various common "annoying" sounds.

There is a positive and quantifiable correlation between loudness and "importance" with a strong relationship between dB and perceived relevance. Fitting this relationship to a cubic expression, a loudness-based metric has been devised as a coefficient ranging in value from 0 to 1, with 1 representing sounds that demand more urgent attention. FIG. 5 illustrates this relationship for various typically relevant or "annoying" sounds. The relationship depicted in FIG. 5 can be expressed as a polynomial function that converts sound level to an "annoyance" or importance score. Specifically, a cubic regression on this data in FIG. 5 may be performed to obtain the expression in Eq. (1).

$$y = \frac{2.448072 - 0.207488x + 0.004573x^2 - 0.000023x^3}{4} \quad (1)$$

However, microphones have a different frequency response than human ears, which are more responsive to certain frequencies than others. By applying an A-weighting to instrument-measured sound levels, the response of the microphones can be transformed into one more representative of a human listener. The A-weighting function $A(f)$ is captured by Eqs. (2-3).

$$R_A(f) = \frac{12194^2 f^4}{(f^2 + 20.6^2)\sqrt{(f^2 + 107.7^2)(f^2 + 737.9^2)}(f^2 + 12194^2)} \quad (2)$$

$$A(f) = 20 \log_{10}(R_A(f)) - 20 \log_{10}(R_A(1000)) \quad (3)$$

As would be realized by one of skill in the art, different coefficients or other means of weighting or providing an equivalence between sounds sensed by a microphone and sounds heard by human ear are within the scope of the invention.

By combining the transformed frequency weight information and the annoyance information, a score is obtained and is applied as a metric for assigning importance to sounds. The resilience of the assigned score may be improved by averaging the score over the last several samples of analyzed audio. The algorithm then becomes more robust to sudden noises that may inflate the sound valuation metric but may not actually be representative of a sound that needs to be focused on.

The following steps can be carried out by the processing stage. The sound separation step can record sounds in the environment of the intelligent vehicle and separates them in terms of distinct sources. The sound localization step localizes the sound sources in the vicinity of the intelligent vehicle using static information about its immediate surroundings such as a map and determines the position and the direction of the sound relative to the intelligent vehicle. The sound classification step can classify the detected sounds and looks specifically for sounds that can correspond to obstacles and constraints that must be accounted for in the safe operation of the intelligent vehicle. For example, in the context of an autonomous vehicle, sounds like sirens from emergency vehicles, vehicle horns, and train whistles are likely to be of interest. A sound ranking step can assign a numerical value that can capture the importance a human would give to the sound and help inform an intelligent vehicle to determine the urgency of an alert. An autonomous vehicle can use the ranking to inform its decision making.

Figure 6:
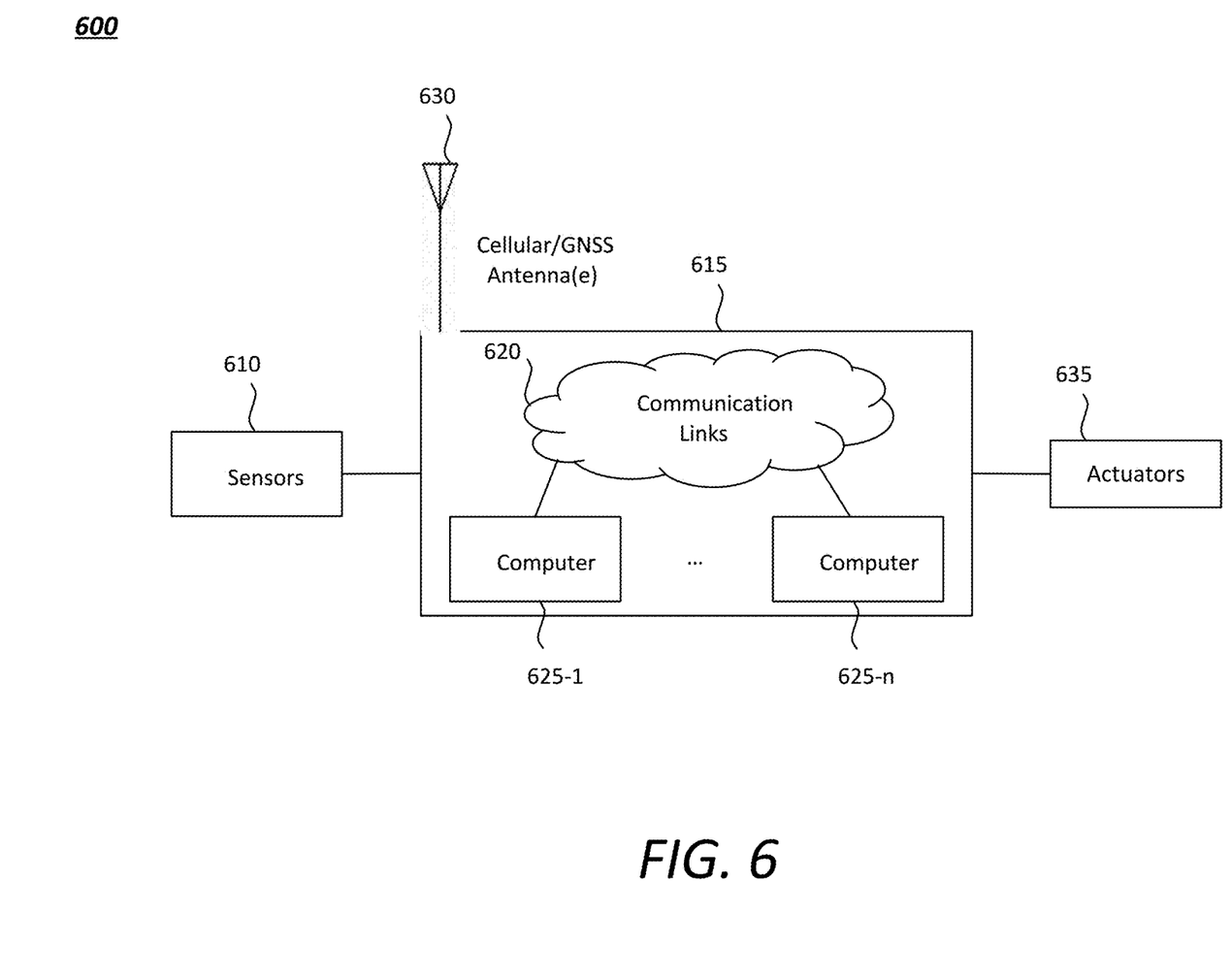
FIG. 6 is a block diagram showing components, including the software subsystem implementing the functions of the present invention, of a control system for an autonomous vehicle.

FIG. 6 is a block diagram showing software and hardware components of an automation system 600 for an autonomous vehicle as one instance of an intelligent vehicle according to embodiments of the claimed invention. The autonomous vehicle can be one of a plethora of vehicle types, such as passenger automobiles, freight vehicles, mass transit vehicles, delivery vehicles, military vehicles, rail vehicles, aircraft, watercraft, submarine vehicles and the like. The automation system 600 comprises one or more sensors 610, a software subsystem 615 and an actuator subsystem 635. The sensors 610 of the automation system 600 can capture or receive data corresponding to the external environment. The sensor(s) 610 can be fitted on the exterior and/or the interior of the autonomous vehicle. For example, possible locations for sensors 610 include, but are not limited to the windshield, the front bumper, the rear bumper, the rear windshield, a passenger or driver door, the fenders, the roof, the undercarriage, the hood, the dashboard, the trunk, the side mirrors, and various combinations thereof. Further, the sensors 610 can be in communication with the software subsystem 615, either directly via hardwiring or via wireless communications. Examples of sensors 610 can include, but are not limited to, cameras, radars, lidars, infrared (IR) cameras, thermal cameras, night-vision cameras, microphones and the like. In preferred embodiments of the present invention, the one or more sensors 610 will include, at a minimum, at least one microphone.

The software subsystem 615 can control certain functions of the autonomous vehicle. For example, the software subsystem 615 can receive sensory data from the sensors 610. In some cases, the software subsystem 615 can also activate the sensors 610 or instruct the sensors to collect certain sensory data (e.g., night vision data, thermal data, specific sound frequencies and the like) at different rates, modes and/or resolutions. The software subsystem 615 can also control the actuation subsystem 635.

The actuation subsystem 635 can include components of the autonomous vehicle that actuate the vehicle. For example, the actuation subsystem 635 can control steering, brakes, throttle, transmission, turn signals, horn, and the like. The software subsystem 615 can be in electronic communication with the actuation subsystem 635 and can send electronic commands or instructions to the actuation subsystem 635 for various components of the actuation subsystem 635 to actuate the autonomous vehicle.

The software subsystem 615 executes on one or more computers 625-1 . . . 625-n. The computers 625-1 . . . 625-n can each include one or more instances of a central processing unit (CPU), a graphics processing unit (GPU), a machine learning accelerator, an image processing unit (IPU), a signal processor, and the like. In some cases, each computer 625 can be in electronic communication with the other computers in the autonomous vehicle, for example via the communication links 620. Thus, a computer 625 can function in series or in parallel with other computers in the autonomous vehicle.

Figure 7:
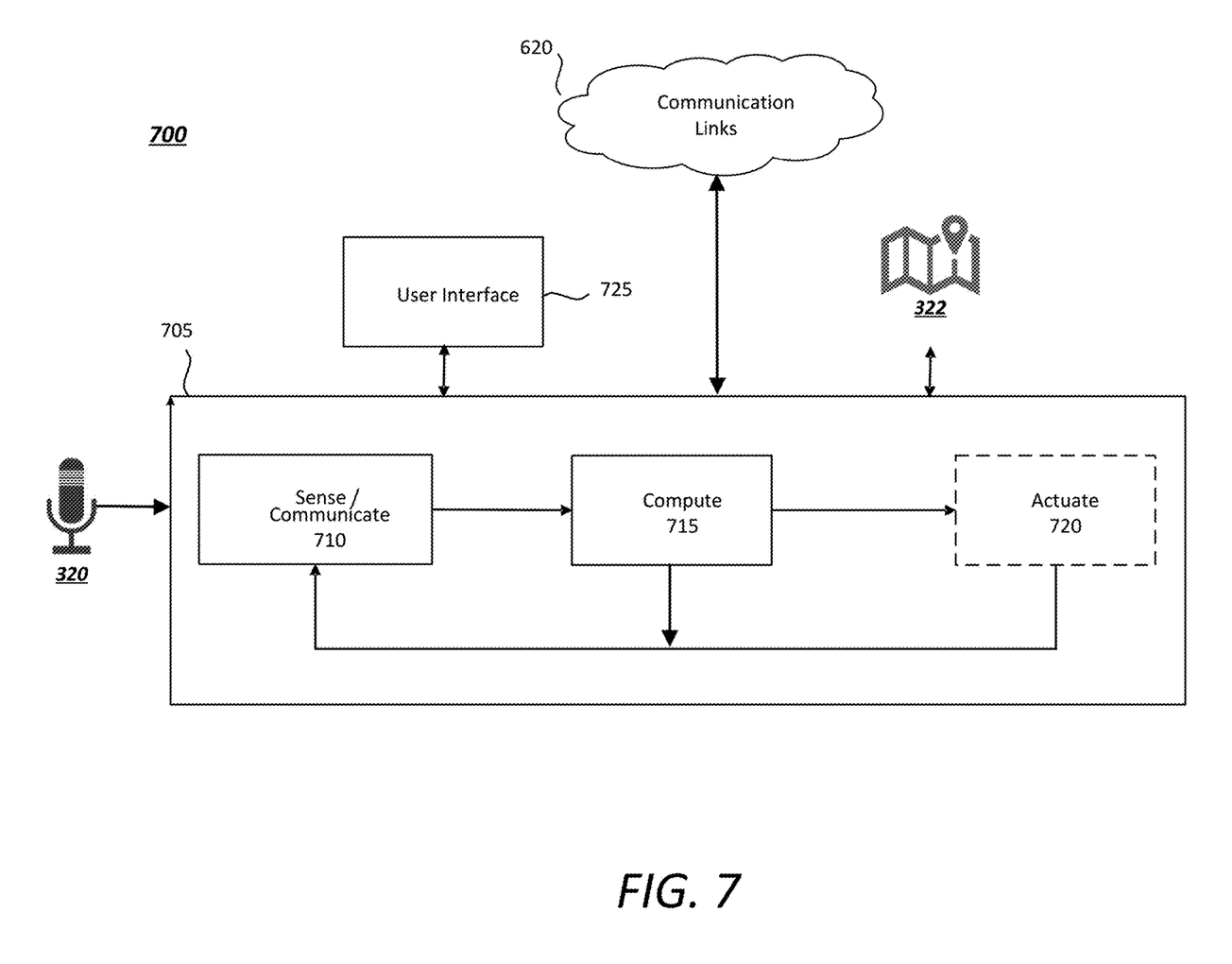
FIG. 7 is a block diagram showing components of a software subsystem operational for implementing one or more aspects of the control of an autonomous vehicle.

FIG. 7 is a block diagram showing a software subsystem 700 according to an embodiment of the claimed invention. The software subsystem 700 can be, for example, one of the one or more software subsystems 615 as described with reference to FIG. 6. More specifically, the software subsystem 700 may implement the functionality of the present invention in accordance with the block diagram shown in FIG. 3A and described above. A software subsystem 700 implementing the functions of the present invention may be integrated with one or more other software subsystems 615 providing functionality for different aspects of the control of an autonomous vehicle or may comprise a standalone software subsystem. The software subsystem 700 may include software implementing the functions of the software subsystem 700 and executing one or more computers 705. The software may include, for example, a sense/communicate process 710, a compute process 715 and an actuate process 720.

In some embodiments, the software subsystem 700 may include a user interface 725. The user interface 725 can be any component configured to receive user input and/or to provide information to the user. For example, the user interface 725 can be a display console configured to provide visual information to the user and/or to receive user input via a touchscreen, a keyboard, and the like. Other examples of a user interface can include one or more speakers configured to provide audible information to the user, one or more microphones configured to receive auditory commands, one or more consoles configured to generate tactile feedback, or a combination thereof. In some cases, the user input can be received via wireless communications, a touchscreen, a switch, a button, a knob, a keyboard, a computer mouse, an interface executing on a smartphone or smartwatch, a drawing pad, a camera, a microphone, and the like. In a software subsystem 700 implementing the functions of the present invention, the user interface may include, for example, a visual, audible or tactile alarm provided to an operator of the autonomous vehicle.

The one or more computers 705 can be in electronic communication with the user interface 725, one or more sensors 610 via the sense/communicate process 710 and one or more actuators 635, via the actuate process 720. The one or more computers 705 can perform various functions for the autonomous vehicle, including decision-making functions, the generation of actuation commands, analyses of the sensory information, and the like.

The sense/communication processes 710 can include receiving and/or transmitting information from various sources external to the software subsystem 700. For example, the one or more computers 705 can receive sensory data from one or sensors of the autonomous vehicle, such as from the sensors 610 as described in FIG. 6. In some cases, the computers 705 can receive communications, for example, from the user interface 725 or a cellular/GNSS antenna 630 shown in FIG. 6.

The actuate processes 720 can include processes for actuating the autonomous vehicle in response to the sense/communicate processes 710. For example, the autonomous vehicle can include a variety of actuators, including but not limited to steering column, brakes, throttle, transmission, turn signals, and the like. The computers 705 can generate commands for actuating one or more actuators of the autonomous vehicle. For example, computers 705 can generate an actuation command such as would result in an increase in speed, a decrease in speed, maintaining speed, instructing the autonomous vehicle to drive around one or more obstacles, instructing the autonomous vehicle to drive over or through one or more obstacles, a continuation of the autonomous vehicle in its current state, maintaining a stationary status until further notice, a gear selection, a horn initiation, an initiation of vehicle flashers, an emergency alert initiation, an unlocking or locking of a door, opening or closing of a window, turning headlights on or off, implementing a direction change, implementing a route change, changes to a map used by the autonomous vehicle, implementing a turn instruction, implementing a lane change, implementing a re-routing, implementing a lateral offset in the travel direction, driving on a road shoulder, driving off-road, following a driving path specified in the operator command, driving over a shoulder, following a specified set of lane markers, sticking to a lane bordered by a specified set of work zone artifacts such as cones and barrels, yielding to other vehicles at an intersection, performing a zipper merge at a merge point, instructing the autonomous vehicle to take its turn, instructing the autonomous vehicle to merge, positioning the autonomous vehicle over to a shoulder of a road, stopping the autonomous vehicle, yielding to an emergency vehicle, requiring manual takeover of the autonomous vehicle, and the like.

The software subsystem 700 can optionally include a map database 322. The map database 430 can store a set of driving maps. For example, the map database 430 can store maps with roadways, along with geographical coordinates for the roadways and other points of interest. In some cases, the computers 705 can implement any of the sense/communication processes 710, the compute processes 715, and the actuate processes 720 utilizing the map data stored in the map database 322.

As an example, the autonomous vehicle may include a software subsystem 700 implementing the functions of the present invention. In a software subsystem 700 implementing the functions of the present invention, the sense/communicate process 710 may receive input from one or more microphones 320. The compute process 715 may analyze the audible input received from the one or microphones 320 in accordance with the block diagram shown in FIG. 3A and described above, and may generate one or more informational outputs, which may be shared with other software subsystems 615 via communication link 620. The software subsystem 700 implementing the functions of the present invention may or may not have an actuate process 720, depending on whether or not the process is designed to control actuators 635 directly, or to provide information to other software subsystems 615 of the autonomous vehicle which may use that information to calculate control signals for actuators 635 via their respective actuate process 720.

An audio-based comprehension of the environment of an autonomous vehicle enhances its ability to respond to various real-life situations that include horns, whistles and sirens. The present invention is an acoustic mapping suite for autonomous vehicles that accomplishes four goals. Firstly, given an autonomous vehicle, the present invention listens to sounds from the immediate environment and separates them in terms of distinct sources with associated directions of arrival. Secondly, these sound sources are localized given information about the world state, the directions of arrival and a particle filter. Thirdly, the sounds are classified using a classifier that, in preferred embodiments, is implemented as a convolutional neural network. Lastly, a numerical score is assigned to the sounds using an importance-based metric. The present invention thus enables the autonomous vehicle to make nuanced decisions based on the sounds in its vicinity.

The invention has been described in terms of specific implementations based on the use of specific methods and components. As would be realized by one of skill in the art, variations of the described systems and methods resulting in the desired outcome are possible and are considered to be within the scope of the invention, which is defined by the following claims.

The invention claimed is:

1. A method for providing aural capability to an intelligent vehicle comprising:
receiving one or more sound inputs;
separating the one or more sound inputs into one or more individual sounds;
localizing sources of the one or more individual sounds; and
classifying the one or more individual sounds as focus sounds;
determining if the one or more individual sounds are interior sounds or exterior sounds;
constraining the locations of the sources of the exterior sounds to specific locations on a map, based on the classification of the exterior sounds.

2. The method of claim 1 wherein the individual sounds are classified using a classifier trained to recognize the focus sounds.

3. The method of claim 2 further comprising:
determining if the one or more exterior sounds are focus sounds using a classifier trained for exterior focus sounds; and
determining if the one or more interior sounds are focus sounds using a classifying trained for interior focus sounds.

4. The method of claim 3 wherein localizing the one or more individual sounds further comprises:
localizing the exterior sounds on a map of the environment.

5. The method of claim 1 further comprising:
controlling one or more actuators of an autonomous vehicle based on the one or more exterior focus sounds and interior focus sounds.

6. The method of claim 5, further comprising:
assigning an importance metric to each classified sound;
wherein controlling the one or more actuators of the autonomous vehicle is based on the importance metric assigned to each classified sound.

7. The method of claim 6 wherein the importance metric is reflective of the importance a human would attribute to the sound.

8. The method of claim 1 further comprising:
providing information regarding the classified focus sounds to a control system of an autonomous vehicle.

9. The method of claim 8, further comprising:
assigning an importance metric to each classified sound;

providing the importance metric for each classified sound to the control system of the autonomous vehicle.

10. The method of claim 1 wherein the one or more sound inputs are received from one or more microphones.

11. The method of claim 10 wherein the one or more microphones are located exterior to an intelligent vehicle, further comprising:
applying filtering to the one or more sound inputs to remove wind or fluid noise.

12. The method of claim 10 wherein the one or more microphones are located interior to an intelligent vehicle.

13. The method of claim 10 wherein the one or more sound inputs are received from two or more microphones and further wherein the localization of the sources of the one or more individual sounds is based, at least in part, on differences in arrival times of the individual sounds at each of the two or more microphones.

14. The method of claim 1 wherein the separation and classifying of individual sounds is based, at least in part, using frequency bands as criteria.

15. The method of claim 1 wherein localization of the sources of the one or more individual sounds further comprises:
determining the direction of arrival of each of the individual sounds;
generating and evaluating multiple hypotheses about the source locations of the sounds;
applying real-world constraints and physical impossibilities to discard unlikely hypotheses regarding the source locations of the sounds;
defining, at each time step, multiple hypotheses regarding the location of the sounds along a vector, with each hypothesis assigned a weight corresponding to a probability that the hypothesis reflects the actual of source of the location of the sound; and
comparing the vectors between successive time steps to track the relative locations of the source of each individual sound and the vehicle.

16. The method of claim 2 wherein the classifier comprises a convolutional neural network.

17. A system for providing aural capability to an intelligent vehicle comprising:
one or more microphones mounted on the intelligent vehicle;
one or more processors; and
software, executing on the one or more processors, the software performing the functions of:
analyzing one or more sound inputs received from the one or more microphones;
separating the one or more sound inputs into one or more individual sounds;
localizing sources of the one or more individual sounds as focus sounds; and
classifying the one or more individual sounds;
determining if the one or more individual sounds are interior sounds or exterior sounds;
constraining the locations of the sources of the exterior sounds to specific locations on a map, based on the classification of the exterior sounds.

18. The system of claim 17 wherein the intelligent vehicle is an autonomous vehicle and further wherein system is integrated into a control system of the autonomous vehicle such that sounds identified by the system may be used by the control system of the autonomous vehicle to make decisions regarding the safety and control the autonomous vehicle or to validate or invalidate map details.

19. The system of claim 17 wherein the system controls one or more actuators on the intelligent vehicle directly.

20. The method of claim 1 wherein the localization of the source of the one or more sounds is assigned a confidence level and further wherein the confidence level may be raised or lowered based on inputs from other sensors on the intelligent vehicle.

21. The method of claim 20 wherein the inputs from other sensors provide a confirmation or non-confirmation of the localization of the source of one or more sounds.

22. The method of claim 21 wherein the confidence level for a sound is raised based on the confirmation of the localization of the source of the sound.

23. The method of claim 21 wherein the confidence level for a sound is lowered based on a non-confirmation of the localization of the source of the sound.

24. The method of claim 20 wherein sounds having a confidence level below a lower threshold are ignored by the intelligent vehicle.

25. The method of claim 20 wherein a high confidence level in the localization of the source of the one or more sounds is used to raise or lower confidence levels of outputs from one or more other sensors on the intelligent vehicle.

26. The method of claim 25 wherein the localization of the source of one or more sounds provides a confirmation or non-confirmation of the outputs from the one or more other sensors on the intelligent vehicle.

27. The method of claim 21 wherein a confidence level of data from a non-sound sensor on the intelligent vehicle is raised based on the confirmation of the localization of the source of the sound.

28. The method of claim 21 wherein a confidence level of data from a non-sound sensor on the intelligent vehicle is lowered based on a non-confirmation of the localization of the source of the sound.

* * * * *

UNITED STATES PATENT AND TRADEMARK OFFICE
CERTIFICATE OF CORRECTION

PATENT NO. : 12,167,210 B2  
APPLICATION NO. : 17/678386  
DATED : December 10, 2024  
INVENTOR(S) : Ragunathan Rajkumar et al.

Page 1 of 1

It is certified that error appears in the above-identified patent and that said Letters Patent is hereby corrected as shown below:

On the Title Page

Item (72), correct first inventor to read "Ragunathan Rajkumar, Monroeville, PA (US)."

Signed and Sealed this  
Eleventh Day of February, 2025

Coke Morgan Stewart  
*Acting Director of the United States Patent and Trademark Office*